Nov. 29, 1927.
C. N. ELLRICH
CHUCK
Filed Sept. 4, 1926
1,651,087
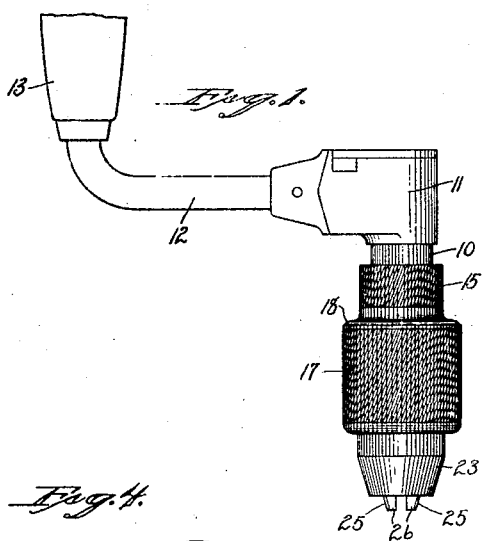
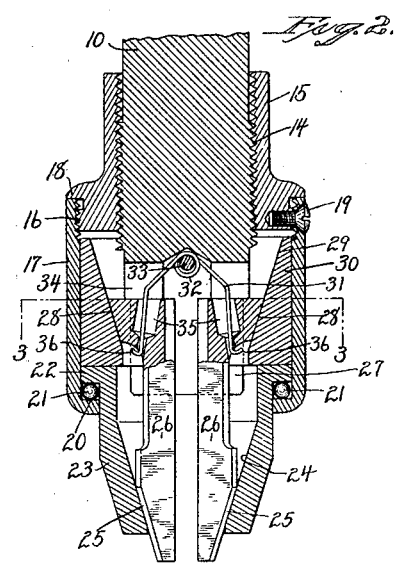
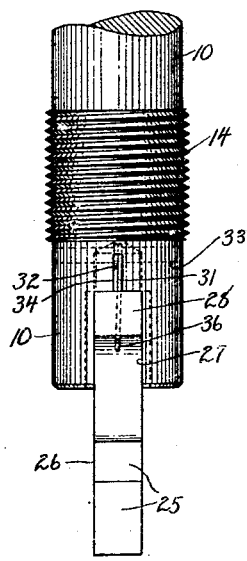
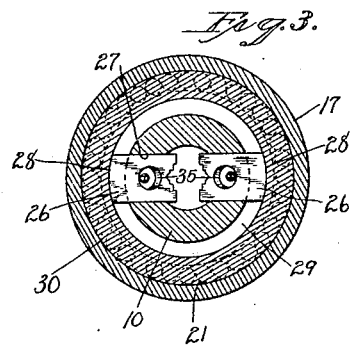
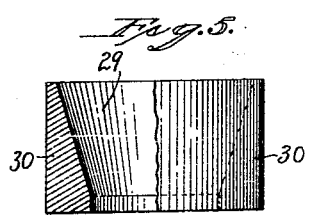
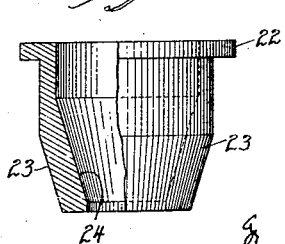
Inventor
Charles N. Ellrich Patented Nov. 29, 1927.

1,651,087

UNITED STATES PATENT OFFICE.

CHARLES N. ELLRICH, OF SOUTHINGTON, CONNECTICUT, ASSIGNOR TO THE PECK STOW & WILCOX CO., OF SOUTHINGTON, CONNECTICUT, A CORPORATION.

CHUCK.

Application filed September 4, 1926. Serial No. 133,709.

Fig. 1 is a broken view in side elevation of a bit-brace with my improved chuck applied thereto.

Fig. 2 is a view of my improved chuck in longitudinal, central section.

Fig. 3 is a transverse, sectional view on the line 3—3 of Fig. 2.

Fig. 4 is a detached view of the shank turned at a right angle to the position in which it is shown in Fig. 2, and showing the jaws in place therein.

Fig. 5 is a detached view, partly in side elevation and partly in section, of the inner cone.

Fig. 6 is a corresponding view of the outer cone.

My invention relates to an improved tool-holding chuck designed primarily for bit-braces, but not so limited in its application, the object being to provide an efficient and durable chuck, composed of few parts, and constructed with particular reference to insuring the uniform movement of the two jaws in a right line, whereby their uniform grip on a tool-shank is insured, and whereby the maxmum amount of gripping action is secured with the minimum amount of exertion by the user.

With these objects in view, my invention consists in a chuck having two correspondingly inclined jaw-operating surfaces movable with respect to the shank of the chuck for sliding coaction with the inner and outer ends of the respective jaws.

My invention further consists in a chuck characterized as above and having certain details of construction and combinations of parts as will be hereinafter described and particularly pointed out in the claims.

For the illustration of my invention, I have shown it as applied to a bit-brace. though, as already indicated, its use is not so limited.

As herein shown, the shank 10 enters a head 11 secured to a crank 12 having a handle 13, these parts being of usual construction. The shank is formed with threads 14 offsetting from its body and providing for the application to it of the internally-threaded cap-member 15 forming a part of the chuck-body. The outer end of the said cap-member is externally-threaded as at 16 for the application to it of the internally-threaded inner end of the cup-member 17 of the chuck-body. The said inner end of the cup-member abuts against a flange 18 near the outer end of the cap-member, the two members being secured together against relative rotation by means of a screw 19. The outer end of the cup-member is inwardly-turned to form an outer race 20 for a series of anti-friction balls 21, the inner race therefor being formed by an outwardly-projecting flange 22 at the inner end of an outer, jaw-operating cone 23, the flanged inner end of which is located within the lower end of the cup-member 17. The cone 23 is formed with an internal, conical surface 24 which coacts with the conically-contoured outer ends 25 of a pair of complementary jaws 26. The inner ends of the said jaws extend into a transverse-slot 27 in the outer end of the shank 10, where they are conically contoured as at 28 for co-action with a conical surface 29 formed within an inner, jaw-operating cone 30 located entirely within the cup-member 17 and at its outer end riding upon the inner end of the outer, jaw-operating cone 23.

The jaw-operating surfaces 24 and 29 whether conical or otherwise, slope in the same direction, whereby the inner and outer ends of the jaws are synchronously moved inward or outward to expand or contract the tool-receiving space between the jaws, the said surfaces 24 and 29 having sliding co-action with the adjacent bevels of the jaws, which are thus maintained in parallelism.

For normally maintaining the bevelled surfaces at the inner and outer ends of the jaws in contact with the co-acting, conical surfaces of the inner and outer jaw-operating cones, I employ a jaw-operating spring 31 formed midway of its ends with a positioning-loop 32, through which a pin 33, diametrically mounted near the outer end of the shank, passes. The inner portion of this spring is located within a narrow slot 34 leading out of the inner end of the slot 27 aforesaid. The respective arms of the said springs pass through inclined clearance-bores 35 in the inner ends of the respective jaws, and at their extreme ends they are bent to form hooks 36 for preventing the appreciable outward movement of the jaws with respect to the shank.

By providing the chuck with an outer and an inner jaw-operating cone for co-action with conically-contoured surfaces at the respective ends of the jaws, the same are uniformly crowded upon the shank, so as to grip the same uniformly and with power, while the insertion of ball-bearings between the cup-member of the body and the outer, jaw-operating cone enables the respective ends of the jaws to be forced against the shank of the tool with great force and with the minimum of effort. By making the inner and outer cones independent of each other, manufacture is facilitated, and they are permitted to relatively rotate according to the conditions of use, but they might be made in one piece, if desired.

I claim:

1. In a chuck, the combination with an externally-threaded shank, of a body comprising a cap-member threaded upon the shank and a cup-member secured to the said cap-member, the latter having its outer end turned inwardly to form a ball-race, an outer jaw-operating cone bodily movable with respect to the said shank and having its inner end extended into the said cup-member and overhanging the ball-race aforesaid, ball-bearings located between the said cup-member and the said outer cone, an inner cone bodily movable with respect to said shank and located within the cup-member and bearing at its outer end upon the inner end of the outer cone, two complementary jaws each having parallel inner and outer cone-engaging surfaces respectively co-acting with the said inner cone and with the said outer cone, and resilient means for yieldingly holding the jaws in their separated positions.

2. In a chuck, the combination with an externally-threaded shank, of a body threaded thereupon, inner and outer cones carried by the said body so as to be movable with respect to the said shank and each having a correspondingly-inclined jaw-operating surface, two complementary jaws having sliding co-action at their inner ends with the said inclined surface of the inner cone and also having sliding co-action at their outer ends with the said inclined surface of the outer cone, and means for yieldingly holding the jaws in their separated positions and against the said jaw-operating surfaces.

3. In a chuck, the combination with an externally-threaded shank, of a body threaded thereupon, inner and outer jaw-operating members carried by the said body so as to be movable with respect to the said shank and each having a correspondingly-inclined jaw-operating surface, two complementary jaws having sliding co-action at their inner ends with the jaw-operating surface of the said inner jaw-operating member and also having sliding co-action at their outer ends with the jaw-operating surface of the said outer jaw-operating member, and means for yieldingly holding the jaws in their separated positions and against the said jaw-operating surfaces.

4. In a chuck, the combination with an externally-threaded shank, of a body comprising a cap-member threaded upon the said shank and a cup-member secured to the said cap-member, inner and outer jaw-operating cones carried by the said body so as to be movable with respect to the said shank and each having correspondingly-inclined jaw-operating surfaces, two complementary jaws having sliding co-action at their inner ends with the inclined surface of the said inner cone and also having sliding co-action at their outer ends with the inclined surface of the said outer cone, and means for holding the jaws in their separated positions and against the said inclined surfaces of the cones.

5. In a chuck, the combination with an externally-threaded shank, of a body threaded upon said shank, inner and outer jaw-operating cones carried by the said body so as to be movable with respect to the said shank and each having correspondingly-inclined jaw-operating surfaces, two complementary jaws having sliding co-action at their inner ends with the jaw-operating surface of the inner cone and also having sliding co-action at their outer ends with the jaw-operating surface of the outer cone, a two-armed spring, and means for coupling the same with the shank and with the respective jaws for limiting the endwise movement of the jaws with respect to the shank.

6. In a chuck, the combination with an externally-threaded shank provided with a jaw-receiving slot and with a spring-receiving slot, of a body threaded upon the said shank, inner and outer cones carried by the said body so as to be movable with respect to the said shank and each having correspondingly-inclined jaw-operating surfaces, two complementary jaws, the inner ends of which enter the said jaw-receiving slot and the inner and outer ends of which have sliding co-action with the jaw-operating surfaces of the inner and outer cones respectively, a spring entering the spring-receiving slot, and means for coupling the same with the shank and with the jaws for moving the latter outwardly and limiting their endwise movement with respect to the shank.

In testimony whereof, I have signed this specification.

CHARLES N. ELLRICH.